United States Patent [19]

Fullalove

[11] 4,402,405
[45] Sep. 6, 1983

[54] PICTORIAL PHONORECORD MAT

[76] Inventor: Ronald M. Fullalove, 2637 Cranston Rd., Philadelphia, Pa. 19131

[21] Appl. No.: 47,194

[22] Filed: Jun. 8, 1979

[51] Int. Cl.³ .................. B65D 85/57; G11B 3/84; C09K 3/00
[52] U.S. Cl. .................. 369/271; 106/37; 206/312; 369/291
[58] Field of Search .......... 206/312, 313; 274/41 R, 274/42 R, 41.6 R, 42 P; 106/37

[56] References Cited

U.S. PATENT DOCUMENTS

| | | | |
|---|---|---|---|
| 1,226,674 | 5/1917 | Kitchen | 369/53 |
| 1,468,879 | 9/1923 | Emerson | 369/291 |
| 1,502,312 | 7/1924 | Mayhew | 369/273 |
| 1,732,747 | 10/1929 | Germain | 274/42 R |
| 2,318,654 | 5/1943 | Wissner | 274/42 R |
| 2,561,971 | 7/1951 | Bustanoby | 88/16 |
| 2,592,026 | 4/1952 | Guboff | 274/42 R |
| 2,906,536 | 9/1959 | Mauerhoff | 274/42 R |
| 3,250,537 | 5/1966 | Henry | 274/42 R |

FOREIGN PATENT DOCUMENTS 1177555  4/1959  France ................ 274/42 R

OTHER PUBLICATIONS

D Stat-II Turntable Mat, Copyright by Discwasher Inc. '77.

Primary Examiner—Herbert F. Ross
Attorney, Agent, or Firm—Caesar, Rivise, Bernstein & Cohen, Ltd.

[57] ABSTRACT

A felt mat having a pictorial image on the fibers thereof, which image is formed from sublimating disperse dyes. An X-cut is formed in the center of the mat to enable the mat to be placed on a phonograph turntable, with the spindle passing through the X-cut. As optional features, the mat is coated with an antistatic agent and has strobe markings on the surface thereof. The strobe markings are also formed from sublimating disperse dyes. The mat can be sold separately or can be packaged with a phonograph record. If packaged with the phonograph record, the mat will be visible in the package, and can contain a photograph of the recording artist and his name or the title of the record or album.

27 Claims, 3 Drawing Figures

PICTORIAL PHONORECORD MAT

This invention relates to a phonograph record mat, and more particularly, to a phonograph record mat having pictorial material on the fibers thereof.

In recent years, a new form of record has been developed, which is referred to as a picture record. The surface of the picture record contains a photograph of the recording artist, which is formed on the plastic of the record. The picture is still visible through the grooves of the record. The picture records are quite costly, and have become collector's items. Only a limited number of picture records have been produced for any given phonograph record that is available in a non-picture form.

The mat of this invention was originally developed to appeal to people who would like to purchase picture records, but could not do so because of the extremely high cost of the same. The mat is formed from felt, and the picture that would normally go on a picture record is printed into the mat utilizing sublimating disperse dyes. The picture quality is excellent, and for a small additional cost, will make any given phonograph record highly desirable, both from an appearance standpoint and from a utilitarian standpoint. It is believed that the pictorial phonorecord mats of this invention will become collector's items.

Once the pictorial phonorecord mat of this invention was conceived, it was also learned that the mat will have substantial utilitarian, as well as ornamental, attributes. The mat can be placed over the turntable of a record player, thereby decorating the turntable. Additionally, the use of the mat reduces motor rumble of the turntable. The mat can also be used to permit the user of the turntable to hold the record steady and permit the turntable to continue to rotate. Thus, the record will slip relative to the underlying mat. When doing this, the phonograph stylus can be aligned with any desired groove in the phonograph record, thereby permitting cueing of the record.

Pictorial material used in connection with phonograph records, such as in the packaging of the records or for use on turntables, has been shown in prior patents. See, for instance, U.S. Pat. Nos. 1,226,674, 1,468,879, 1,502,312 and 2,561,971. However, none of these patents discloses the fiber mat of this invention having the pictorial material thereon.

Similarly, it has been known in the art to utilize felt mats on turntables. However, none of these prior felt mats had any pictorial material thereon, and accordingly were useful solely for utilitarian purposes. They were not collectable, in the sense of picture records, nor were they in any way ornamental.

It is accordingly an object of this invention to provide a novel pictorial phonorecord mat.

It is another object of this invention to provide a package comprising a phonograph record and a pictorial phonorecord mat.

It is a further object of this invention to provide the combination of a turntable and a pictorial phonograph mat.

These and other objects of this invention are accomplished by providing a phonograph mat comprising a felt disc, an opening formed in said disc for placing said disc over the spindle of a turntable and pictorial material formed on the fibers of said disc, said pictorial material being formed from sublimating disperse dyes.

Other objects and many of the attendant advantages of this invention will be readily appreciated as the same becomes better understood by reference to the following detailed description when considered in connection with the accompanying drawings wherein.

Figure 1:
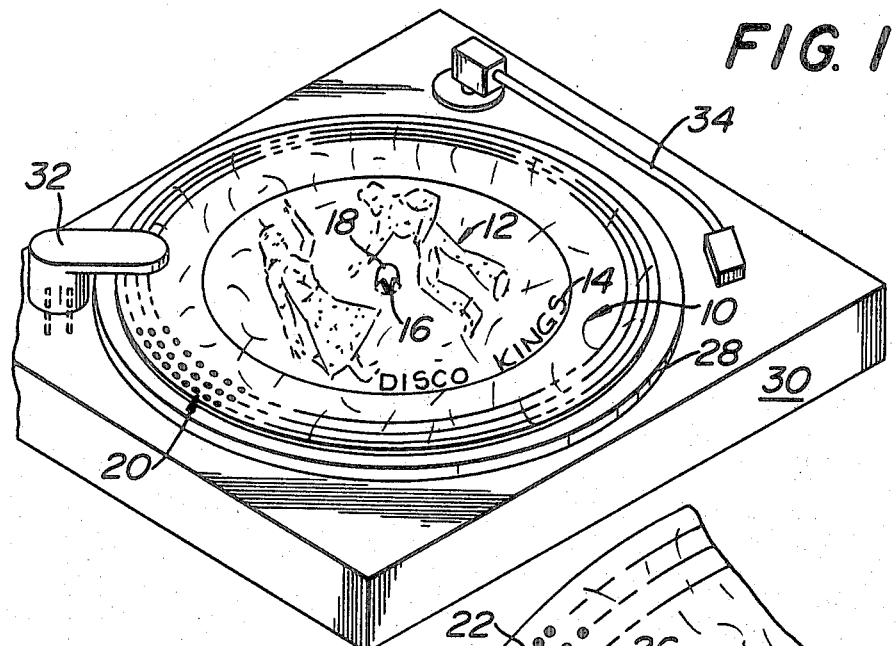
FIG. 1 is a perspective view of a phonograph turntable having the mat of this invention positioned thereon.
Figure 3:
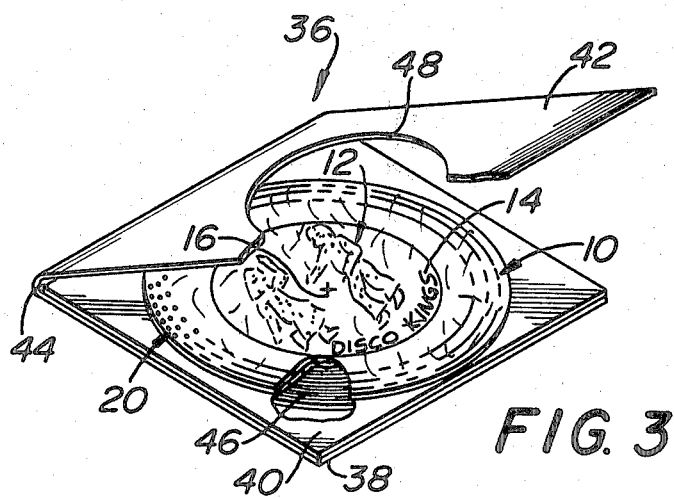
FIG. 3 is a perspective view of a phonograph record album having the mat of this invention displayed therein.

Referring now in greater detail to the various figures of the drawings wherein like reference characters refer to like parts, a pictorial phonorecord mat embodying the present invention is generally shown at 10 in FIGS. 1 and 3. Mat 10 is formed from a felt and has pictorial matter 12 thereon.

The felt of mat 10 can comprise any felt adapted to receive and clearly display pictorial or other indicia applied thereto by sublimation transfer printing. The mat can be white or colored. A preferred material for the mat is polyester fiber. Preferably, the fiber is 3 denier, and the mat is formed by a conventional felting process, without the use of any adhesive. The weight of the felt is six ounces per linear yard (155 g/m.). The mat can vary in thickness from 0.027 to 0.040 inch (0.069 to 0.102 cm.).

In addition to the pictorial material 12, other indicia can be placed on the mat. By way of example, the service mark of the recording artist can also be placed adjacent the pictorial material. In the embodiment shown, the name of a fictitious recording group is shown at 14, under the pictorial material.

It should be understood that in actual usage, the pictorial material 12 and the service mark 14 will be of famous recording groups. The actual pictorial material can comprise the pictorial material that will usually appear on the album cover.

The mat 10 is of a circular configuration, and includes an X-cut 16 punched in the center thereof (FIG. 3). The purpose of the X-cut is to enable the mat to be placed over the spindle 18 (FIG. 1) of a record turntable. However, when the mat is not placed on a turntable, its surface will be continuous, and the X-cut 16 will not be readily visible. Accordingly, if there is any pictorial material in the center of the mat, it will not be visibly disturbed by the X-cut. This permits the mat to be used for display or ornamental purposes when it is not used on a turntable. This also facilitates the sale of the mat. In the prior art, non-pictorial phonorecord mats, there was a hole punched in the center thereof for placing the mat over a spindle. Such a hole could be deleterious to the phonorecord mat of this invention if the hole were placed in a position where pictorial material appeared.

Figure 2:
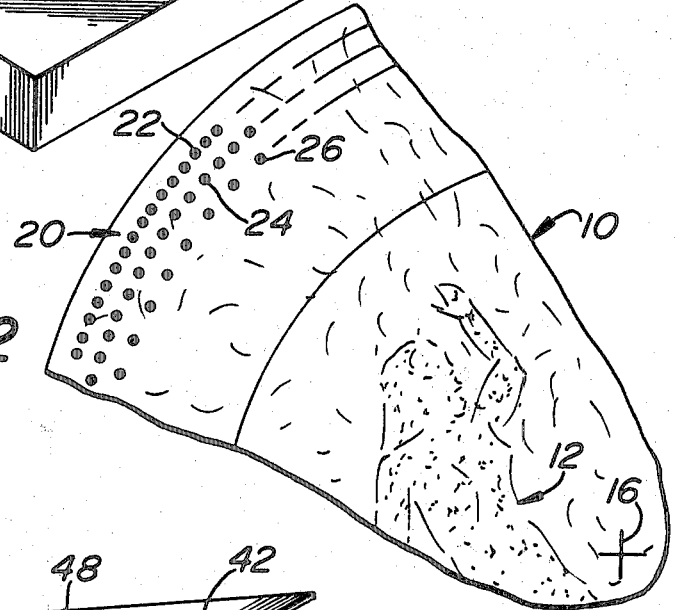
FIG. 2 is a partial perspective view of the mat of this invention.

As an optional feature of this invention, three concentric rings of spaced markings 22 are formed adjacent the outer edge of the upper surface of mat 10. As best shown in FIG. 2, rings 22, 24 and 26 have their markings differently spaced, although the markings in any given ring are equally spaced. Although not shown in the drawings, for the purpose of clarity, each set of markings makes a complete circle on the upper surface of the mat 10. The markings are strobe markings which are used to verify the rotational speed of the turntable on which the mat is placed. Ring 22 contains 216 dots, ring 24 contains 160 and ring 26 contains 92 dots. These rings provide strobe markings for 33⅓, 45 and 78 rpm, respectively. The strobe markings are well known to the art, and have been used on turntables in the past. The markings and their function are well known to the art, although they have not been used in connection with felt phonorecord mats in the past.

The use of the mat of this invention in connection with a turntable is generally shown in FIG. 1. As seen in FIG. 1, the mat 10 is placed on a turntable 28, supported by a conventional platform 30. Mounted on the platform 30 is a strobe light 32 and a tone arm 34. The mat 10 is placed on turntable 28 by inserting the spindle 18 through the X-cut 16. A phonograph record can then be placed over the spindle 18 and it will rest on the mat 10. The phonograph can then be operated in the normal manner.

With the mat in the position shown in FIG. 1, and prior to the placing of a phonograph record on the turntable, when the turntable is operated, its rotational speed can be tested. Thus, the rotational speed of the turntable will be set for $33\frac{1}{3}$, 45 or 78 rpm. The strobe light 32 is turned on, and if the phonograph is operating at the correct speed, the ring 20 for that speed will appear to be motionless under the strobe light. This is the conventional manner in which the strobe light and strobe markings are used.

The mat of this invention can be sold in its own package, or it is preferably sold as part of a record album. One embodiment of the mat in combination with an album is generally shown at 36 in FIG. 3. The album 36 comprises a jacket having a bottom wall 38, a top wall 40 and a flap 42. The top and bottom walls are sealed along their sides and bottom edges, and are open at the top 44. A phonograph record 46 can then be inserted between walls 38 and 40 through the opening 44 at the top.

The mat 10 is loosely placed on wall 40, and is held in place by flap 42. Flap 42 includes a central opening 48 through which the pictorial material 12 and indicia 14 are visible. The entire album can then be packaged in a transparent shrink film, as is customary in the art. With the album so packaged, the customer will be able to determine that the felt mat of this invention is included as part of the package.

It should be understood that the mat of this invention can be packaged with other types of phonograph albums. It can be inserted between two walls of a conventional jacket, along with the phonograph record, or may be placed on the exterior of one of the walls of the jacket, and held in place by the transparent film.

One of the features of the mat of this invention is the manner of applying the pictorial material 12, the indicia 14 and the strobe markings 20. All of this material is printed on the mat by sublimation transfer printing. The material to be printed is first placed on transfer sheets, using conventional sublimating disperse dyes. One to four, or even five, color printing can be done. The transfers are made by a conventional process. First the design is created and photographed. Thereafter, the color separations are prepared. The artwork is then transferred to the paper backing, utilizing the sublimating disperse dyes. The material is then transferred from the paper backing to the felt mat utilizing heat and pressure.

The use of sublimation transfer printing is now conventional with applying designs or artwork to garments. The same type of process is used with applying the artwork or other indicia to the felt mat of this invention. The time, heat and temperature used to transfer the dye to the receiving mat are all well known to those skilled in the art. By way of example, the transfer will take place in 20 to 35 seconds, at a temperature of 365° to 410° F. (185° to 210° C.), and at a pressure one ounce to five pounds per square inch (4.74 g to 0.352 kg/sq. cm.).

The use of the sublimated disperse dyes is highly preferred for carrying out this invention because these dyes leave no surface residue on the mat. The surface texture of the mat is identical to the touch regardless of whether any of the printed material is on the mat. The reason for this is that the sublimating dyes are actually gasified when heat and pressure are applied, and the dyes are absorbed within the interstices of the mat. Utilizing the other types of printing, such as plastisol transfers or silk screening, results in the formation of a residue on the surface of the mat.

Having the dyes absorbed in the mat greatly reduces the friction on the surface of the mat when a phonograph record is placed thereon. This permits the holding of the record and the slippage of the record relative to the turntable, to enable the record to be cued, as explained above. This could not be accomplished if other types of printing residue were on the surface of the mat.

As another optional feature, the surface of the mat can be provided with an antistatic coating. The antistatic coatings on turntable mats are known to the art. However, none has ever been used with the mat of this invention. The purpose of the antistatic coatings is to reduce the charge in the phonograph record, thereby preventing the record from attracting dust.

Any of the antistatic solutions known to the art can be used in connection with this invention. Generally, these antistatic solutions comprise an antistatic agent in solution with an isoporopanol-water mixture. Suitable antistatic sprays are isoporopanol-water solutions of Stearamidopropyldimethyl-$\beta$-hydroxyethylammonium nitrate; molecular weight 475.8, which is sold by American Cyanamid Company under the Trademark CYASTAT SN, or diisobutylphenoxyethoxyethyldimethylbenzylammonium chloride monohydrate; molecular weight 466.1, which is sold by Rohm and Haas Company under the Trademark HYAMINE 1622. Other antistatic solutions known to the art can also be used.

As pointed out above, the polyester felt mat of this invention is formed without the use any adhesives. It has been found that where adhesives are used in binding the felt, it is more difficult to obtain picture clarity in the printing.

It should be understood that the use of the strobe light 32 shown in FIG. 1 is purely an optional feature. The strobe light can be mounted in the position shown when the strobe markings are adjacent the outer edge of the mat 10. The strobe markings can be positioned on other portions of the mat, such as adjacent the center, in which case the pictorial material will surround the strobe markings or overlie the strobe markings. The mat can be used with a portable strobe light, or for that matter, under any artificial lighting. However, they are most effective and easily used when there is a strobe light adjacent the markings.

Without further elaboration, the foregoing will so fully illustrate my invention, that others may, by applying current or future knowledge, readily adapt the same for use under various conditions of service.

What is claimed as the invention is:

1. A phonorecord mat comprising a felt disc, an opening formed in said disc for placing said disc over the spindle of a turntable, and pictorial material formed on the fibers of said disc, said pictorial material being formed from sublimating disperse dyes.

2. The phonorecord mat of claim 1 wherein the felt of said disc comprises polyester fibers.

3. The phonorecord mat of claim 2 wherein said fibers are self adhering, and no adhesive is present.

4. The phonorecord mat of claim 1 wherein said opening comprises an X-cut, with said X-cut giving the appearance of a continuous felt, thereby retaining the visual integrity of the pictorial material on said mat.

5. The phonorecord mat of claim 1 and further including indicia on the fibers of said disc, said indicia being formed from sublimating disperse dyes.

6. The phonorecord mat of claim 1 and further including at least one ring of strobe markings formed on the fibers of said disc, said strobe markings being formed from sublimating disperse dyes.

7. The phonorecord mat of claim 6 wherein a plurality of rings of strobe markings are formed on said disc, with each ring being adapted to be used with a different rotational speed of a turntable.

8. The phonorecord mat of claim 1 wherein said mat has the surface thereof treated with an antistatic material.

9. A phonograph record album comprising a record jacket, a phonograph record and a phonorecord mat, said mat comprising a felt disc, an opening formed in said disc for placing said disc over the spindle of a turntable, and pictorial material formed on the fibers of said disc, said pictorial material being formed from sublimating disperse dyes.

10. The album of claim 9 wherein said jacket comprises a bottom wall, a top wall and a flap overlying said top wall, said mat being positioned between said top wall and said flap.

11. The album of claim 10 wherein said flap has an opening therein, and said pictorial material is visible through said opening.

12. The album of claim 9 wherein the felt of said disc comprises polyester fibers.

13. The album of claim 12 wherein said fibers are self adhesive, and no adhesive is present.

14. The album of claim 9 wherein said opening comprises an X-cut, with said X-cut giving the appearance of a continuous felt, thereby retaining the visual integrity of the pictorial material on said mat.

15. The album of claim 9 and further including indicia on the fibers of said disc, said indicia being formed from sublimating disperse dyes.

16. The album of claim 9 and further including at least one ring of strobe markings formed on the fibers of said disc, said strobe markings being formed from sublimating disperse dyes.

17. The album of claim 16 wherein a plurality of rings of strobe markings are formed on said disc, with each ring being adpated to be used with a different rotational speed of a turntable.

18. The album of claim 9 wherein said mat has the surface thereof treated with an antistatic material.

19. In combination, a record player having a turntable and a spindle, and a phonorecord mat on said turntable, said phonorecord mat comprising a felt disc, an opening formed in said disc, with said spindle passing through said opening, and pictorial material formed on the fibers of said disc, said pictorial material being formed from sublimating disperse dyes.

20. The combination of claim 19 wherein the felt of said disc comprises polyester fibers.

21. The combination of claim 20 wherein said fibers are self adhering, and no adhesive is present.

22. The combination of claim 19 wherein said opening comprises an X-cut, with said X-cut giving the appearance of a continuous felt, thereby retaining the visual integrity of the pictorial material on said mat.

23. The combination of claim 19 and further including indicia on the fibers of said disc, said indicia being formed from sublimating disperse dyes.

24. The combination of claim 19 and further including at least one ring of strobe markings formed on the fibers of said disc, said strobe markings being formed from sublimating disperse dyes.

25. The combination of claim 24 wherein a plurality of rings of strobe markings are formed on said disc, with each ring being adapted to be used with a different rotational speed of a turntable.

26. The combination of claim 19 wherein said mat has the surface thereof treated with an antistatic material.

27. The combination of claim 24 and further including a strobe light on said record player, said strobe light being mounted adjacent said turntable, and said strobe light being adapted to cast illumination on said strobe markings.

* * * * *